United States Patent [19]

Pugh et al.

[11] 3,969,304

[45] July 13, 1976

[54] ETHYLENE POLYMER FILMS

[75] Inventors: Donald W. Pugh, Milford; James W. Biggs, Lebanon, both of Ohio

[73] Assignee: National Distillers and Chemical Corporation, New York, N.Y.

[22] Filed: Nov. 27, 1974

[21] Appl. No.: 527,783

[52] U.S. Cl......................... 260/32.6 PQ; 260/42.46
[51] Int. Cl.$^2$........................................... C08K 5/20
[58] Field of Search......................... 260/32.6, 42.46

[56] References Cited

UNITED STATES PATENTS

| | | | |
|---|---|---|---|
| 2,956,035 | 10/1960 | Mock | 260/42.46 |
| 2,991,264 | 7/1961 | Monroe, Jr. et al. | 260/42.46 |
| 3,021,296 | 2/1962 | Ammondson | 260/32.6 |

FOREIGN PATENTS OR APPLICATIONS

| | | | |
|---|---|---|---|
| 915,589 | 8/1961 | United Kingdom | 260/32.6 |

*Primary Examiner*—J. Ziegler
*Attorney, Agent, or Firm*—Kenneth D. Tremain

[57] ABSTRACT

The properties of an ethylene polymer film is improved by replacing a portion of the anti-blocking agent therein with N,N'-ethylene-bis-erucamide.

16 Claims, No Drawings

ETHYLENE POLYMER FILMS

BACKGROUND OF THE INVENTION

Self-supporting ethylene polymer films are characterized by poor slip properties, that is, they do not readily slide over each other. This poor slip property interferes with the use of the films in automatic processing equipment because the film must be capable of freely passing through the fabricating machine, be it a heat-sealer, bag maker, bag loader or filler, bag opener or overwrap package, in order that the machine operate properly.

The ethylene polymer films are also characterized by a tendency to resist separation by a separating force applied perpendicular to the film, e.g., by a simple lifting action. This property, known as blocking, contributes to the poor handling characteristics of the film. For example, in blown tube extrusion, blocking occurs at the nip rolls used to retain the inflating gas within the tube and the temperature of the tubular film entering the nip rolls is frequently high enough to cause the film layers to stick or adhere to each other.

Ethylene polymer film layers are normally separated by a combination of sliding and lifting forces. Accordingly, it will be recognized that the slip and block characteristics of the film bear a close relationship to one another. The lifting force used during separation is resisted by the normal blocking force of the film and the sliding force is resisted by the slip forces, i.e., friction. Thus, although the blocking and sliding or slip forces are theoretically at right angles to each other, both blocking and slipping are problems encountered in the commercial processing of ethylene polymer films.

In order to improve the processability of ethylene polymer films, it is conventional practice to incorporate slip agents and anti-block agents into the ethylene polymer prior to extrusion. Over the years, numerous materials have been evaluated and polymer compositions having reasonable anti-block and slip properties have been developed. For many applications, the plastic films are required to have good optical properties, and in such formulations, a delicate balance between the base resin, anti-blocking agent and slip agent is necessary in order to obtain a high clarity film.

We have now found that improved ethylene polymer films can be obtained by replacing a portion of the anti-blocking agent conventionally employed with N,N'-ethylene-bis-erucamide. The N,N'-ethylene-bis-erucamide, hereinafter referred to as EBE, is a good anti-blocking agent but cannot be used as the sole anti-blocking agent in the resin composition because it also has a high coefficient of friction and would therefore neutralize the effect of the slip agent. We have also found that the use of EBE will improve the optical properties in high clarity film compositions.

Various amides have been proposed for incorporation into polyolefin film compositions. For example, British Pat. No. 915,589 teaches the incorporation of from 0.01–3% of an unsaturated fatty acid amide having at least 8 carbon atoms in the molecule, such as erucamide, in crystallizable linear polymers and copolymers of alpha-olefins having at least 3 carbon atoms. This British patent also teaches the additional use of 0.01–1% of a saturated fatty acid amide, for example, alkylene distearamides such as methylene and ethylene distearamides. U.S. Pat. No. 2,770,609 as well as the British Pat. No. teach that generally unsaturated fatty acid amides tend to reduce coefficient of friction (COF) whereas saturated fatty acid amides tend to reduce film blocking.

A printing and heat sealing problem has always existed when stearamide is used in polyethylene films at concentrations of greater than 0.1 weight percent. To solve this problem, inorganic materials, and particularly silicas, have been utilized instead of organic anti-block agents. The combination of an unsaturated amide such as oleamide or erucamide with an inorganic anti-blocking agent such as diatomaceous earth (see U.S. Pat. No. 2,956,035) has provided the best commercial composition to date for high speed, economical polyethylene film production. The aforementioned patent states that high clarity films having haze of less than 14% have a high tendency to block. Since this patent was issued high clarity commercial polyethylene films have haze values of less than 7% putting more emphasis on the need for effective anti-blocking agents. The use of diatomaceous silica of particle size range to be effective as an anti-blocking (see U.S. Pat. No. 3,028,355) creates a problem of reducing the clarity (haze) of the polyethylene film. This is mentioned by Mock in his August, 1974 article in Plastic Technology, pages 41–43 (see especially page 43, second column).

U.S. Pat. No. 3,021,296 teaches that ethylene bis oleamide has minimum exudation and is thereby a better slip and anti-blocking agent especially upon storage. However, in many commercial operations, the film is electronically treated for printing and sealing in-line and thus the special feature claimed is of no advantage at all. Furthermore, a printing problem is encountered with the use of ethylene bis oleamide.

U.S. Pat. No. 3,165,492 teaches that alkylene bis amides such as N,N'-ethylene bis oleamide and N,N'-ethylene bis erucamide impart desirable slip (low COF) properties to polyolefin films whereas N,N'-ethylene bis stearamide gave inferior slip properties, i.e., > 0.6. U.S. Pat. No. 2,938,879 also teaches that COF values greater than 0.6 indicate poor slip, COF values of 0.6 to 0.46 indicate fair (marginal) slip and COF values of 0.45 or less indicate good slip. From Table I of U.S. Pat. No. 3,165,492 one would expect that N,N'-ethylene bis erucamide used along would impart good slip properties. However, this was not found in our work; it was found that a good slip agent such as erucamide was necessary to impart "good" slip properties.

The use of EBE is distinct from such prior art as will become apparent in the following description. For example, in view of the necessity of using silica as the anti-blocking agent to avoid the problem in printing on the film and in heat sealing, the discovery that EBE could replace a portion of the silica thereby improving optical properties (haze) while maintaining satisfactory resistance to blocking and without detrimentally affecting the printability of the polyethylene film was indeed surprising.

It is the object of this invention to provide a new composition which will produce ethylene polymer films having improved properties and particularly ethylene polymer films of high optical clarity. This and other objects of the invention will become apparent to those skilled in the art from the following detailed description.

SUMMARY OF THE INVENTION

This invention relates to ethylene polymer films and particularly to ethylene polymer films characterized by improved anti-blocking characteristics and improved optical characteristics in which a portion of the conventional anti-blocking agent is replaced with N,N'-ethylene bis erucamide.

DESCRIPTION OF THE PREFERRED EMBODIMENTS

In accordance with the present invention, a portion of the anti-blocking component in conventional ethylene polymer film compositions is replaced wit EBE. The thermoplastic polymer compositions so modified can be any of the compositions known heretofore. Such compositions generally contain the ethylene polymer, a slip agent, an anti-blocking agent, and other additives and ingredients such as anti-oxidants, dyes, pigments, lubricants, ultraviolet light stabilizers, and anti-static agents such as tertiary and quaternary amines.

The formulation can contain any of the ethylene polymer resins known in the art as "film grade". The ethylene polymer can be a homopolymer in which case any of the commercially available film grade high or low density polyethylenes can be used. Such film grade resins generally have a melt index of 0.2–12 and a density of about 0.917 to 0.937; the homopolymers generally employed in high clarity formulations usually have a melt index of about 1.0–8.0 and a density of about 0.918–0.927.

The ethylene polymer can also be a film grade copolymer of ethylene with an alpha-olefin of 3–10 carbon atoms such as an ethylene-propylene copolymer, or a copolymer of ethylene with a vinyl ester of a 2–6 carbon atom aliphatic carboxylic acid such as vinyl formate, vinyl acetate, vinyl trimethylacetate, vinyl propionate, vinyl butyrate, vinyl triacetate, and the like.

Typical slip agents include inorganic powders such as calcium carbonate, magnesium carbonate, diatomaceous earth, and the like, and organic materials such as ethylene bis stearamide, polyethylene glycol dioleate, anionic sodium alkyl naphthalene sulfonates, sodium stearate, methylene bis stearamide, dodecyl trimethyl ammonium chloride, oleamide, erucamide, N-methylol oleamide, stearamide, N-(2-hydroxy ethanyl) oleamide, and various petroleum waxes. In high clarity formulations, it is preferred to use the unsaturated fatty acid amides having at least 8 carbon atoms such as oleamide and erucamide as the slip agent.

Typical anti-blocking agents include ethylene bis oleamide, dimethyl stearamide, dimethyl palmitamide, silica, ethylene bis stearamide, methylene bis stearamide, stearamide, behenylamide and the like. For the high clarity formulations, the use of an inorganic anti-blocking agent such as silica is preferred.

In general, the ethylene polymer compositions for film use will contain about 0.01–1% of one or more slip agents, preferably about 0.03–0.15% and about 0.01–1% of one or more anti-blocking agents, preferably about 0.7–0.40%, based on the weight of the ethylene polymer. In the preparation of high clarity films, the slip agent will generally be used in an amount equivalent to about 0.01–0.2%, preferably about 0.03–0.1%, and the anti-blocking agent in an amount equivalent to about 0.05–0.5%, preferably about 0.10–0.3%, based on the weight of the ethylene polymer.

In the compositions of this invention, a portion of the anti-blocking agent is replaced with EBE. The particular proportion of the anti-blocking agent replaced depends, of course, on the improvement in properties desired. Usually not more than about 50% of the anti-blocking agent will be replaced with the same amount by weight of EBE ad usually at least about 30% of the anti-blocking agent will be replaced. Thus, for general film applications the ethylene polymer composition will contain about 0.01–0.50 weight percent slip agent, about 0.01–0.50 weight percent anti-blocking agent, and about 0.01–0.50 weight percent EBE, and preferably about 0.02–0.10% slip agent, about 0.03–0.25 weight percent anti-blocking agent and about 0.03–0.25 weight percent EBE. In high clarity formulations, the ethylene polymer will contain about 0.01–0.15 weight percent and preferably 0.02–0.1 weight percent slip, about 0.01–0.30 weight percent, and preferably about 0.02–0.2 weight percent anti-blocking agent, and about 0.01–0.30 weight percent and preferably 0.02–0.2 weight percent EBE.

The EBE can be prepared by conventional methods used to prepare diamides. In other words, the diamide is prepared by reacting a suitable diamine, ethylene diamine in this case, with an appropriate carboxylic acid, erucic acid in this case, or the corresponding acid anhydride or acid chloride. Two typical procedures are given in the Examples below.

The components of the thermoplastic film composition are admixed according to conventional practices and no special procedures are necessary. For example, the ethylene polymer, anti-blocking agent, slip agent and EBE can be tumbled in a twin-cone blender for a period of time which can range from, for example, 10 minutes to 1 hour. Usually a blending time of 30 minutes is satisfactory. The resulting admixtures are then extruded by conventional mono-extrusion and co-extrusion processes into the desired thin (about 0.5–10 mils) plastic films.

In order to more fully illustrate the present invention, various Examples are set forth below. Throughout these Examples, as well as the entire specification and claims, all temperatures are in degrees centigrade and all parts and percentages are by weight unless otherwise specified.

EXAMPLE 1

Preparation of EBE

A charge of 60 g (0.1775 mols) of erucic acid and 5.32 g (0.0887 mols) of ethylene diamine were placed in a 500 ml round bottom flask. The charge was heated at 160°–200° C. for 2 hours or until all of the water had been driven off. The resulting brown product was dissolved in benzene, carbon treated, filtered hot through a steam funnel and cooled to crystallize a light brown product. The light brown product was then dissolved in hot ethanol after establishing a melting point of 120°–123° C. and the ethanol solution was carbon treated and filtered hot through a steam funnel. The solution was cooled slowly and then filtered. The resulting light yellow product weighed 30 grams and had a melting point of 122°–124° C.

EXAMPLE 2

Preparation of EBE

Into a dry 1 liter 3-neck round bottom flask fitted with a stirrer, thermometer, nitrogen inlet, and water cooled reflux condenser, 311.5 g of pure erucic acid and 250 ml of dry benzene were introduced. The solution was heated to 50° C. and 142 g of oxalyl chloride was slowly added dropwise over a 1 hour period. After the addition, the solution was stirred and heated under a nitrogen atmosphere for 1 hour at 65° C. and then cooled. Excess oxalyl chloride and benzene solvent were distilled off using a water pump to establish a vacuum, and low heat. The resulting erucoyl chloride weighed 330 g.

230 g of the erucoyl chloride was removed from the reaction flask leaving 100 g of erucoyl chloride (0.28 mol). 8.7 g (0.14 mol) of ethylene diamine in 50 ml of dry benzene was added dropwise with stirring over a ½ hour period. The mixture was then refluxed for 1 hour. The solution had turned yellow as the ethylene diamine was added and at the end of the hour the solution was found to be slightly acid.

Aqueous sodium hydroxide was added until the solution was neutral and then the benzene was distilled off under reduced pressure. The light yellow product was then washed out of the flask with acetone in which it was not soluble. After the acetone was filtered off, an almost white solid that was slightly soluble in ethanol was obtained. The product was crystallized from a large volume of 200-proof ethanol, filtering off the insoluble white cloud. The product was then washed with hot water and filtered to remove salt and the final EBE was determined to have a melting point of 120°–122° C.

EXAMPLE 3

Two test polyethylene film formulations were prepared using a polyethylene having a melt index of 1.5 and a density of 0.926. A control formulation of the same polyethylene containing 0.11% erucamide as slip agent and 0.1% silica as anti-blocking agent was also prepared. The first test formulation substituted EBE for the erucamide in the control formulation. The second test formulation replaced one-half of the erucamide slip agent with EBE. Films were extruded on a 2.5 inch Hartig extruder and the resulting films evaluated. The control formulation exhibited a COF of 0.09 and the two test films exhibited COFs of 0.49 and 0.42, respectively.

These experiments illustrate that EBE is not a commercially acceptable slip agent and cannot be substituted for a portion of the slip agent since the high coefficient of friction of EBE neutralizes the low friction factor imparted to the formulation by the slip agent.

EXAMPLE 4

Four polyethylene film formulations were prepared, extruded into film and then the coefficient of friction (slip property), blocking properties, haze and gloss was determined. The formulations and properties of the resulting films are shown in the following Table.

Blocking was determined by cutting a butt roll of blown film which had been stored at about 25° C. and 50% relative humidity for at least 24 hours across its width to remove at least 15 layers. The roll was removed, the stack of newly cut layers inverted, the top 2 or 3 layers discarded, and the remaining layers coded. Care was taken not to use film from the first 1 inch build-up on the core. Individually, five experienced people unaware of the code significance grasped the tubing between thumb and forefingers, applied a sliding pressure and rated the film on a scale of 0 (unopenable) to 100 (film falls open). The average of the ratings is the openability or blocking level of the film. A value of 70 is considered the minimum commercially acceptable.

TABLE

| Run | 1 | 2 | 3 | 4 |
|---|---|---|---|---|
| Erucylamide, % | 0.06 | 0.09 | 0.09 | 0.11 |
| Silica, % | 0.05 | 0.05 | 0.07 | 0.1 |
| EBE, % | 0.1 | 0.07 | 0.05 | 0 |
| Coefficient of friction (ASTM D-1894) | 0.23 | 0.14 | 0.10 | 0.10 |
| Blocking (100 = no block) | 75 | 79 | 80 | 82 |
| Haze, % (ASTM D-1003) | 6.3 | 6.5 | 7.0 | 7.3 |
| Gloss, % (ASTM D-523) | 10.6 | 10.6 | 10.4 | 10.6 |

The foregoing results demonstrate that EBE can replace a portion of the silica anti-blocking agent and achieve commercially acceptable anti-blocking properties and also gain improved haze properties.

EXAMPLE 5

Four ethylene polymer films were prepared using a polyethylene resin having a melt index of 8.0 and a density of 0.924 and 0.10% of one of four anti-blocking agents. The four anti-blocking agents employed were ethylene bis oleamide, ethylene bis stearamide, EBE and silica. Each of the four films exhibited good anti-blocking characteristics. Additionally, the coefficient of friction for each film was determined and the following results were obtained:

| Agent | Coefficient of Friction |
|---|---|
| Ethylene bis oleamide | 0.49 |
| Ethylene bis stearamide | 0.78 |
| Ethylene bis erucamide | 0.60 |
| Silica | 0.77 |
| None | 0.84 |

Various changes and modifications can be made in the process and products of the instant invention without departing from the spirit and scope thereof. The various embodiments set forth herein were for the purpose of further illustrating the invention and were not intended to limit it.

We claim:

1. A composition comprising (a) a film grade ethylene polymer; (b) about 0.01–0.5 weight percent of N,N'-ethylene bis erucamide; (c) about 0.01–0.5 weight percent of slip agent which is different than said bis erucamide; and (d) about 0.01–0.5 weight percent anti-block agent which is different than said bis erucamide and slip agent; said percentages based on the weight of the ethylene polymer.

2. The composition of claim 1 wherein the amount of slip agent is 0.02–0.1%, the amount of anti-block agent is about 0.03–0.25 weight percent, and the amount of the N,N'-ethylene bis erucamide is about 0.03–0.25%.

3. The composition of claim 2 wherein the ethylene polymer is polyethylene having a melt index in the range of about 0.2–12 and a density in the range of about 0.917–0.937.

4. The composition of claim 1 wherein the amount of slip agent is about 0.01–0.15%, the amount of anti-block agent is about 0.01–0.30% and the amount of N,N'-ethylene bis erucamide is about 0.01–0.30%.

5. The composition of claim 4 wherein the amount of slip agent is 0.02–0.1%, the amount of anti-block agent is about 0.02–0.2% and the amount of N,N'-ethylene bis erucamide is 0.02–0.2%.

6. The composition of claim 5 wherein the ethylene polymer is polyethylene having a melt index in the range of about 1–8 and a density in the range of about 0.918–0.927.

7. The composition of claim 1 wherein the slip agent is about erucamide and the anti-block agent is silica.

8. A self-supporting plastic film comprising (a) a film grade ethylene polymer; (b) about 0.01–0.5 weight percent of N,N'-ethylene bis erucamide; (c) about 0.01–0.5 weight percent of slip agent which is different than said bis erucamide; and (d) about 0.01–0.5 weight percent of anti-block agent which is different than said bis erucamide and slip agent; said percentages based on the weight of the ethylene polymer.

9. The self-supporting plastic film of claim 8 wherein the amount of slip agent is about 0.02–0.1 weight percent, the amount of anti-block agent is about 0.03–0.25 weight percent, and the amount of the N,N'-ethylene bis erucamide is 0.03–0.25 weight percent.

10. The self-supporting plastic film of claim 8 wherein the amount of slip agent is about 0.01–0.15%, the amount of anti-block agent is 0.01–0.3% and the amount of N,N'-ethylene bis erucamide is about 0.01–0.3%.

11. The self-supporting plastic film of claim 10 wherein the amount of slip agent is 0.02–0.1%, the amount of anti-block agent is 0.02–0.2% and the amount of N,N'-ethylene bis eurcamide is 0.02–0.2%.

12. The self-supporting plastic film of claim 11 wherein the ethylene polymer is polyethylene having a melt index in the range of about 1.0–8.0 and having a density in the range of about 0.918–0.927.

13. The self-supporting plastic film of claim 12 wherein the slip agent is erucamide and the anti-block agent is silica.

14. A process for forming a self-supporting ethylene polymer film which comprises forming a homogeneous mixture comprising (a) a film grade ethylene polymer; (b) about 0.01–0.5 weight percent of N,N'-ethylene bis erucamide; (c) about 0.01–0.05 weight percent of slip agent which is different than said bis erucamide; and (d) about 0.01–0.5 weight percent of anti-block agent which is different than said bis erucamide and slip agent; said percentages based on the weight of the ethylene polymer; and thereafter melt extruding the homogeneous mixture into film.

15. The process of claim 14 wherein said ethylene polymer is polyethylene having a melt index in the range of about 1.0–8.0 and a density in the range of about 0.918–0.927, said slip agent is erucamide, and said anti-block agent is silica.

16. The process of claim 14 wherein the homogeneous mixture contains about 0.01–0.15% slip agent, about 0.01–0.30% anti-block agent and about 0.01–0.30% N,N'-ethylene bis erucamide.

* * * * *